2,743,297

N-SUBSTITUTED AMIDE DERIVATIVES OF 1,1-DIHYDROPERFLUOROALKYLAMINES

Donald R. Husted, St. Paul, and Arthur H. Ahlbrecht, White Bear Township, Ramsey County, Minn., assignors to Minnesota Mining & Manufacturing Company, St. Paul, Minn., a corporation of Delaware No Drawing. Application February 8, 1954, Serial No. 408,995

5 Claims. (Cl. 260—561)

This application is a continuation-in-part of our copending application S. N. 149,458, filed March 13, 1950; since issued as Patent No. 2,691,043 on Oct. 5, 1954.

This invention relates to a new and useful class of fluorocarbon compounds.

These new compounds are amides derived from fluorinated primary amines (that have in the molecule a fully fluorinated terminal fluorocarbon "tail") by replacement of a nitrogen-bonded hydrogen atom with an acyl group. More particularly, they are N-substituted amide derivatives of 1,1-dihydroperfluoroalkylamines wherein the perfluoroalkyl group provides the molecule with a terminal fluorocarbon group (serving as a fluorocarbon "tail") containing from 3 to 12 fully fluorinated carbon atoms. The parent 1,1-dihydroperfluoroalkylamine compounds are described and claimed in our aforesaid prior application, and have the formula:

$$C_nF_{2n+1}CH_2NH_2$$

where $n$ has an integer value of 3 to 12.

The present amide derivative compounds may be termed N - (1,1 - dihydroperfluoroalkyl)acylamides and are represented by the formula:

$$RCONHCH_2C_nF_{2n+1}$$

where $n$ has an integer value of 3 to 12, and "RCO" is an aliphatic acyl group (i. e., the residue of an aliphatic monocarboxylic acid, the hydroxyl group of which has been replaced); "R" representing the saturated or unsaturated terminal sub-group which is an alkyl group, a perfluoroalkyl group, or an alkenyl group, bonded to the carbonyl carbon atom, both hydrocarbon and fluorocarbon groups being illustrated by the experimental examples hereinafter described. The acyl group may contain a lengthy "R" chain, such as that of stearic acid (in which case the acyl group is a stearyl group, which contains 18 carbon atoms).

In the actual preparation of these compounds the acyl group is not supplied by employing a free acid (the use of which would result in a salt rather than an amide) but by using an acid chloride or an acid anhydride. Use can also be made of esters although in general they are not as satisfactory. The reaction is performed under anhydrous conditions. The reactions in which an acid chloride or an acid anhydride is reacted with the amine to produce the desired amide product are shown by the respective equations:

$$2C_nF_{2n+1}CH_2NH_2+RCOCl\rightarrow$$
$$RCONHCH_2C_nF_{2n+1}+C_nF_{2n+1}CH_2NH_2\cdot HCl$$

$$C_nF_{2n+1}CH_2NH_2+(RCO)_2O\rightarrow$$
$$RCONHCH_2C_nF_{2n+1}+RCOOH$$

These amide compound are highly resistant to hydrolysis by acid and base. For this reason the standard Kjeldahl analytical procedure is ineffective. Several of the amides distilled unchanged from refluxing in concentrated sulfuric acid during attempts to analyze them by this method.

The saturated compounds are extremely stable and are highly resistant to oxidation. Their solubility properties depend in part upon the terminal groups. When both are relatively short, these compounds are only slightly soluble in water, and they become increasingly insoluble with increase in chain length. They are soluble in oxygenated organic solvents (such as acetone and ethers). The fluorocarbon "tail" supplied by the amine compound is per se both hydrophobic and eleophobic and becomes increasingly so with increase in length, and renders its end of the amide molecule insoluble in both aqueous and organic liquids. When the "R" group is a methyl or other hydrocarbon alkyl group, the molecule has a terminal group that imparts solubility in oils and hydrocarbon liquids, and increasingly so as the length of the group increases to provide an oleophilic alkyl "tail" that strongly solubilizes that end of the molecule toward oils and hydrocarbon liquids, although it is hydrophobic and insolubilizes that end of the molecule toward water. Thus it is possible to provide a molecule having a fluorocarbon (perfluoroalkyl) "tail" at one end that is both hydrophobic and eleophobic, and a hydrocarbon "tail" at the other end that is hydrophobic but eleophilic; and such compounds have utility as surface active agents for uses where this combination is desirable (for example as an emulsifying agent for fluorocarbons and oils, the agent collecting at the interfaces with the fluorocarbon "tails" dissolved in the fluorocarbon phase and the hydrocarbon "tails" dissolved in the oil phase). When the acyl group provides a fluorocarbon "R" group "tail" (as in the case of the acyl group of perfluorobutyric acid), then both ends of the amide molecule have fluorocarbon "tails" and such compounds are relatively insoluble both in water and in oils but are soluble in fluorocarbon liquids.

The saturated amides, because of their extreme thermal stability and because they are low-melting and high-boiling, have utility as heat exchange liquids for use at elevated temperatures. Most but not all of the compounds are solid at room temperature. However, the N-(1,1-dihydroperfluorobutyl)butyramide:

$$C_3H_7CONHCH_2C_3F_7$$

for example, is an oil at room temperature and has a vacuum boiling point of 107° C. (at 12 mm.), and is believed to have practical utility as a pumping fluid for oil-diffusion type high-vacuum pumps.

Of particular interest are the amides containing unsaturated acyl groups in which "R" is an alkenyl group. These are highly stable to hydrolysis, but are reactive and provide starting compounds for making derivatives. They also have utility in providing reactive monomers from which various useful polymers and copolymers can be made, the acrylamide and methacrylamide compounds being particularly noteworthy. An example of a homopolymerizable monomer, that polymerizes inter se when heated in the presence of a little benzoyl peroxide catalyst, is the N-(1,1-dihydroperfluorohexyl)acrylamide:

$$CH_2=CHCONHCH_2C_5F_{11}$$

The following illustrative experimental examples provide further data on the subject compounds.

*Example 1*

This example illustrates the preparation of the normal N-(1,1-dihydroperfluorobutyl)acetamide compound:

$$CH_3CONHCH_2CF_2CF_2CF_3$$

which is the lowest member of the series, containing the smallest number of carbon atoms. In this case the fluorocarbon "tail" is a normal perfluorobutyl group containing three fully fluorinated carbon atoms. The formula can also be written as:

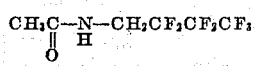

which more clearly shows the structure.

A 25 ml. flask equipped with a reflux condenser was charged with 5 grams of normal 1,1-dihydroperfluorobutylamine:

a liquid compound having a boiling point of 68° C. (at 740 mm.). To this was slowly added at room temperature 3.06 grams of acetic anhydride:

The mixture was heated and refluxed for 16 hours. Sufficient water was added to hydrolyze the excess acetic anhydride. The crystalline layer was separated by filtration and was washed once with water at room temperature. The crude solid had a melting point of 49° C. It was purified by recrystallization from hot carbon tetrachloride, and was identified as the desired product in relatively pure form. The melting point was 51.5° C. Analysis showed 51.3% fluorine (calc. 55.2%) and 5.78% nitrogen (calc. 5.82%). The infrared absorption spectral curve confirmed the identification.

*Example 2*

The procedure was the same as in the preceding example except that the flask was charged with 3.2 grams of the butylamine to which was added 6.2 grams of normal perfluorobutyric anhydride:

The crystalline product after washing twice with water and recrystallizing from hot carbon tetrachloride, was identified as relatively pure normal N-(1,1-dihydroperfluorobutyl)perfluorobutyramide:

it had a melting point of 63–64° C. Fluorine analysis showed 66.7% F (calc. 67.3%). On attempted analysis for nitrogen by the standard Kjeldahl procedure, the sample sublimed unchanged from hot sulfuric acid. The infrared curve substantiated the identification.

*Example 3*

The apparatus was a 100 ml. 3-necked flask fitted with a reflux condenser whose outlet was protected by a drying tube, a magnetic bottom-drive stirrer, and a dropping funnel. It was charged with 9.95 grams (0.05 mole) of 1,1-dihydroperfluorobutylamine and 30 ml. of anhydrous diethyl ether. To this solution was added dropwise with vigorous stirring 2.67 grams (0.025 mole) of butyryl chloride. Stirring was continued at 25° C. for one hour after the addition to allow completion of the reaction. At the end of this time the white precipitate of 1,1-dihydroperfluorobutylamine hydrochloride ($C_2F_7CH_2NH_2 \cdot HCl$) was removed by filtration.

The filtrate was concentrated by vacuum distillation to remove the ether. The product (3.2 grams) was a viscous oil, having a boiling point of 107° C. at 12 mm., and was identified as N-(1,1-dihydroperfluorobutyl)butyramide:

It had a refractive index at 25° C. of 1.3588. Analysis showed 35.8% carbon (calc. 35.7%) and 5.14% nitrogen (calc. 5.20%).

*Example 4*

The procedure was the same as in the preceding example except that the butylamine (9.95 grams) was reacted with 7.6 grams (0.025 mole) of stearyl chloride ($C_{17}H_{35}COCl$). After vacuum distillation, the crude waxy amide product was recovered in a yield of 12 grams and had a melting point of 63.0–64.4° C. It was purified by sublimation in a high vacuum at 59° C. ($10^{-4}$ mm. pressure) and then had a melting point of 65.5–66.0° C. It was identified as relatively pure N-(1,1-dihydroperfluorobutyl)stearamide:

Analysis showed 31% F (calc. 29%), and 3.23% N (calc. 3.01%). This compound can also be purified by recrystallization from a hot ethanol-water mixture.

*Example 5*

The apparatus was a 100 ml. 3-necked flask equipped with a reflux condenser, magnetic stirrer, and dropping funnel. It was charged with 15.7 grams (0.05 mole) of normal 1,1-dihydoperfluorohexylamine and 35 ml. of anhydrous ether. To the solution was added with stirring 1.96 grams (0.025 mole) of acetyl chloride. Stirring was continued for 1½ hours after the addition was completed. The precipitated amine hydrochloride was removed by filtration and the filtrate was subjected to vacuum distillation to remove the ether. The crude amide product had a melting point of 54.5° C. It was purified by vacuum sublimation at 40° C. and $10^{-4}$ mm. pressure and then had a melting point of 53.0–53.5° C. It was identified as relatively pure normal N-(1,1-dihydroperfluorohexyl)acetamide:

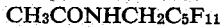

Analysis showed 28.0% C (calc. 28.2%), 62.0% F (calc. 61.3%), and 4.09% N (calc. 4.12%).

*Example 6*

The procedure was the same as in the preceding example except that the hexylamine (15.7 grams) was reacted with 5.82 grams (0.025 mole) of perfluorobutyryl chloride. The crude amide product (11 grams) had a melting point of 49–50° C. It was purified by vacuum sublimation and then had a melting point of 49.5–50.0° C. It was identified as relatively pure normal N-(1,1-dihydroperfluorohexyl)perfluorobutyramide:

Analysis showed 24.2% C (calc. 24.2%), 70% F (calc. 69%), and 2.79% N (calc. 2.82%). The Debye-Scherrer X-ray fine powder pattern showed three prominent lines: 4.76 vvs, 4.53 vvs, 4.34 vs.

*Example 7*

In the same manner the hexylamine (15.7 grams) was reacted with 2.66 grams (0.025 mole) of butyryl chloride. The purified amide product obtained by sublimation (at 38° C. and $10^{-4}$ mm. pressure) had a melting point of 34.0–34.5° C. and was identified as relatively pure normal N-(1,1-dihydroperfluorohexyl)butyramide:

Analysis showed 3.74% N (calc. 3.79%).

*Example 8*

In the same manner the hexylamine (15.7 grams) was reacted with 7.6 grams (0.025 mole) of stearyl chloride. The crude waxy amide product melted at 68–69° C. It was purified by vacuum sublimation at 70° C. and $10^{-4}$ mm. pressure and then had a melting point of 70–71° C. It was identified as relatively pure N-(1,1-dihydroperfluorohexyl) stearamide:

Analysis showed 2.52% N (calc. 2.47%).

The following examples illustrate the preparation of acrylamide derivatives, which are reactive and capable of polymerization, and have the general formula:

where $n$ has an integer value of 3 to 12.

Example 9

The apparatus was a 100 ml. 3-necked flask equipped with a reflux condenser protected by a drying tube outlet, a magnetic bottom-drive stirrer, and a dropping funnel. It was charged with 9.95 grams (0.05 mole) of 1,1-dihydroperfluorobutylamine and 30 ml. of anhydrous ether. To this solution was added dropwise with vigorous stirring 2.25 grams (0.025 mole) of acrylyl chloride ($CH_2=CHCOCl$). Stirring was continued at 25° C. for one hour to allow completion of the reaction. The precipitated amine hydrochloride ($C_3F_7CH_2NH_2 \cdot HCl$) was removed by filtration and amounted to 5.6 grams.

The filtrate was subjected to vacuum distillation to remove the ether and provide 6.3 grams of crude amide product. This was purified by recrystallization from petroleum ether (B. P. 30–60° C.) and resulted in a product having a melting point of 57.2–57.4° C., which was identified as relatively pure normal N-(1,1-dihydroperfluorobutyl)acrylamide:

$$CH_2=CHCONHCH_2CF_2CF_2CF_3$$

Analysis showed 33.6% C (calc. 33.2%), 54.0% F (cal. 52.5%), and 5.46% N (calc. 5.53%). The infrared absorption spectral curve showed absorption bands characteristic of CF, CH, C=C, amide C=O, and C—NH. No starting material was identified as being present.

This compound was found to polymerize when heated in an evacuated ampoule with a small amount of benzoyl peroxide catalyst.

Example 10

The apparatus was a 500 ml. 3-necked flask equipped with a reflux condenser protected by a drying tube outlet, a magnetic stirrer, and a dropping funnel. It was charged with 90 grams (0.3 mole) of 1,1-dihydroperfluorohexylamine and 200 ml. of anhydrous ether. The flask was cooled in an ice bath. To the solution was added dropwise with constant stirring 13.5 grams (0.15 mole) of acrylyl chloride. Then 50 ml. of ether was added and stirring was continued for 3 hours. The white precipitate of amine hydrochloride was removed by filtration and amounted to 50.1 grams.

The filtrate was subjected to vacuum distillation to remove the ether, and the crude product was purified by recrystallization from a mixture of petroleum ether and diethyl ether in 6 to 1 ratio, heating to effect solution and then cooling in an ice bath with stirring. The crystals were recovered by filtration and air dried. Yield was 46.5 grams (88%). This purified product had a melting point of 63–64° C. and was identified as relatively pure normal N-(1,1-dihydroperfluorohexyl) acrylamide:

$$CH_2=CHCONHCH_2C_5F_{11}$$

Analysis showed 3.98% nitrogen (calc. 3.97%).

A sample of this acrylamide was heated in an evacuated glass ampoule for 90 minutes at 170° C., using 0.1% benzoyl peroxide as catalyst. The homopolymer product was a light tan, transparent, brittle solid. It began to soften on a heated brass block at 115–130° C. and became fluid with some discoloration at 240° C. It was soluble in methyl perfluorobutyrate, but was insoluble in water and in hydrocarbons and common organic solvents. The surface of the polymer was both hydrophobic and oleophobic. Transparent films could be formed by casting solutions of the polymer in methyl perfluorobutyrate. Transparent fibers could be drawn both from these solutions and from the molten polymer. A solution of this polymer in methyl perfluorobutyrate had an inherent viscosity of 0.27 at a concentration of 0.66 gram per 100 ml. of solution.

Copolymerization is illustrated by experiments in which samples of this acrylamide monomer were mixed with equimolar portions of each of the following comonomers: styrene, acrylonitrile and vinyl acetate, and sealed in evacuated glass ampoules with 0.1% benzoyl peroxide as catalyst. The ampoules were heated for 18 hours at 95–98° C. The styrene copolymer was a white, translucent, crumbly resin which softened on a heated brass block at 125° C.; it was soluble in methyl perfluorobutyrate. The acrylonitrile copolymer was a hard, brittle, transparent yellow resin which softened on a heated brass block at 160° C. It was insoluble in common organic solvents. The vinyl acetate copolymer was a hard, colorless, transparent resin which softened on a heated brass block at 100° C. and was slightly soluble in methyl perfluorobutyrate.

Example 11

The apparatus was a 50 ml. flask equipped with reflux condenser, magnetic stirrer, and dropping funnel. It was charged with 4.0 grams (0.01 mole) of normal 1,1-dihydroperfluorooctylamine and 15 ml. of anhydrous ether. To this was added dropwise with constant stirring (and with the flask cooled in an ice bath) 0.45 gram (0.005 mole) of acrylyl chloride. After further stirring for 2 hours, the white solid amine hydrochloride precipitate was removed by filtration.

The crude amide product (recovered by vacuum distillation of the filtrate to remove the ether) had a melting point of 49–50° C. It was purified by vacuum sublimation at 40° C. and $10^{-4}$ mm. pressure. The product had a melting point of 49–50° C. and was identified as relatively pure normal N-(1,1-dihydroperfluorooctyl)acrylamide:

$$CH_2=CHCONHCH_2C_7F_{15}$$

Analysis showed 63% F (calc. 63%) and 3.06% N (calc. 3.04%).

We claim:

1. As new and useful compounds, the N-(1,1-dihydroperfluoroalkyl)acylamides having the formula:

$$RCONHCH_2C_nF_{2n+1}$$

where "RCO" is an aliphatic acyl group in which "R" is a terminal sub-group of the class consisting of alkyl, perfluoroalkyl and alkenyl groups, and $n$ has an integer value of 3 to 12.

2. The compound N-(1,1-dihydroperfluorobutyl)perfluorobutyramide having the formula:

$$CF_3CF_2CF_2CONHCH_2CF_2CF_2CF_3$$

3. The compound N-(1,1-dihydroperfluorobutyl)butyramide having the formula:

$$CH_3CH_2CH_2CONHCH_2CF_2CF_2CF_3$$

4. The compound N-(1,1-dihydroperfluorobutyl)acetamide having the formula:

$$CH_3CONHCH_2CF_2CF_2CF_3$$

5. The compound N-(1,1-dihydroperfluorohexyl)acrylamide having the formula:

$$CH_2=CHCONHCH_2C_5F_{11}$$

References Cited in the file of this patent

UNITED STATES PATENTS

| | | |
|---|---|---|
| 2,521,902 | Coover et al. | Sept. 12, 1950 |
| 2,559,752 | Berry | July 10, 1951 |
| 2,617,817 | Ahlbrecht | Nov. 11, 1952 |

OTHER REFERENCES

Bourne et al.: "J. Chem. Soc." (London), Oct. 1952, pp. 4014–19.